(12) United States Patent
Khawer et al.

(10) Patent No.: US 11,496,629 B2
(45) Date of Patent: Nov. 8, 2022

(54) FLEXIBLE CHARGING MECHANISM FOR SHARED SPECTRUM USAGE

(71) Applicant: Nokia Solutions and Networks Oy, Espoo (FI)

(72) Inventors: Mohammad Riaz Khawer, Lake Hopatcong, NJ (US); Milind M. Buddhikot, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/264,610

(22) PCT Filed: Jul. 31, 2018

(86) PCT No.: PCT/US2018/044637
§ 371 (c)(1),
(2) Date: Jan. 29, 2021

(87) PCT Pub. No.: WO2020/027807
PCT Pub. Date: Feb. 6, 2020

(65) Prior Publication Data
US 2021/0234964 A1    Jul. 29, 2021

(51) Int. Cl.
*H04M 15/00* (2006.01)
*H04W 16/14* (2009.01)

(52) U.S. Cl.
CPC ....... *H04M 15/60* (2013.01); *H04M 15/8257* (2013.01); *H04W 16/14* (2013.01)

(58) Field of Classification Search
CPC .. H04W 16/14; H04M 15/60; H04M 15/8257
See application file for complete search history.

(56) References Cited

U.S. PATENT DOCUMENTS

| | | | |
|---|---|---|---|
| 2014/0064247 A1* | 3/2014 | Teyeb | H04W 36/0083 370/331 |
| 2014/0269364 A1* | 9/2014 | Knapp | H04W 24/02 370/252 |

(Continued)

OTHER PUBLICATIONS

Luo, et al., "Spectrum Reservation Contract Design in TV White Space Networks," IEEE Transactions on Cognitive Communications and Networking, vol. 1, No. 2, Jun. 2015, pp. 147-160.

(Continued)

*Primary Examiner* — Joshua L Schwartz
(74) *Attorney, Agent, or Firm* — Tong, Rea, Bentley & Kim, LLC

(57) ABSTRACT

A spectrum access system (SAS) grants one or more channels of a shared spectrum to a base station, e.g., in response to receiving a registration request from the base station. The SAS increments a usage of a connection between the base station and the SAS in response to the SAS receiving information indicating that the base station has an active connection with the apparatus during a service time interval. The processor does not increment the usage if the base station does not have an active connection with the apparatus during the service time interval. In some cases, the active connection is indicated by heartbeat messages exchanged between the base station and the SAS. A customer associated with the base station is charged a cost based on the usage determined by the SAS.

20 Claims, 10 Drawing Sheets

(56) References Cited

U.S. PATENT DOCUMENTS

2015/0319624 A1* 11/2015 Garcia .................... H04W 8/26
370/329
2017/0295497 A1* 10/2017 Macmullan ........... H04W 24/02

OTHER PUBLICATIONS

Palola, et al., "Field Trial of the 3.5 GHz Citizens Broadband Radio Service Governed by a Spectrum Access System (SAS)," 2017 IEEE International Symposium On Dynamic Spectrum Access Networks (DYSPAN), Mar. 6, 2017, 9 pages.

Software Defined Radio Forum Inc., "Signaling Protocols and Procedures for Citizens Broadband Radio Service (CBRS): Spectrum Access System (SAS)—Citizens Broadband Radio Service Device (CBSD) Interface Technical Specification," Document WINNF-16-S-0016, Version V1.0.0, Spectrum Sharing Committee Work Group 3 (Protocols) SAS-CBSD TS, WINNF-16-S-0016, Version V1.0.0, Nov. 29, 2016, 62 pages.

International Search Report and Written Opinion mailed in corresponding PCT/US2018/044637 dated Mar. 7, 2019, 14 pages.

* cited by examiner

FLEXIBLE CHARGING MECHANISM FOR SHARED SPECTRUM USAGE

CROSS-REFERENCE TO RELATED APPLICATIONS

The present application is a 371 application of PCT Patent Application Serial No. PCT/US2018/044637, entitled "A FLEXIBLE CHARGING MECHANISM FOR SHARED SPECTRUM USAGE", and filed on 31 Jul. 2018, the entirety of which is incorporated by reference herein.

BACKGROUND

Description of the Related Art

Spectrum is the most precious commodity in deploying wireless networks such as a private enterprise network. Cellular communication systems, such as networks that provide wireless connectivity using Long Term Evolution (LTE) standards, provide more reliable service and superior quality-of-service (QoS) than comparable services provided by conventional contention-based services in unlicensed frequency bands, such as Wi-Fi. The most valuable spectrum available for cellular communication is at frequencies below 6 Gigahertz (GHz) because transmissions at these frequencies do not require a clear line of sight between the transmitter and the receiver. Much of the sub-6-GHz spectrum is already auctioned off as statically licensed spectrum to various mobile network operators (MNOs) that implement cellular communication system such as LTE networks. The 3.1-4.2 GHz spectrum is occupied by incumbents such as Fixed Satellite System (FSS) and federal incumbents such as U.S. government or military entities. For example, the 3550-3700 MHz frequency band (CBRS band) was previously reserved for exclusive use by incumbents including the United States Navy and Fixed Satellite Service (FSS) earth stations. This band of the spectrum is often highly underutilized. Consequently, organizations and vertical industries such as package distribution companies, energy producers, ports, mines, hospitals, and universities do not have access to sub-6-GHz spectrum and are therefore unable to establish private enterprise networks to provide cellular service such as LTE.

The Federal Communication Commission (FCC) has begun offering bands of spectrum owned by federal entities for sharing with commercial operations. For example, newly issued FCC rules in 47 Code of Federal Regulations (CFR) Part 96 allows sharing of the 3550-3700 MHz Citizens Broadband Radio Service (CBRS) between incumbents and other operators. The CBRS operates according to a tiered access architecture that distinguishes between incumbents, operators that have received a priority access license (PAL) consistent with 47 CFR § 96.23, et seq., and general authorized access (GAA) operators that are authorized to implement one or more Citizens Band Service Devices (CBSDs) consistent with 47 CFR § 96.33, et seq. Incumbents, PAL licensees, and GAA operators are required to request access from a spectrum access system (SAS), which allocates frequency bands to the operators, e.g., for CBRS within the 3550-3700 MHz band. The frequency bands are allocated to the CBSDs associated with the operators within particular geographical areas and, in some cases, during particular time intervals. The SAS determines whether incumbents are present within corresponding geographical areas using an environmental sensing capability (ESC) that performs incumbent detection, e.g., using radar to detect the presence of a Navy ship in a port. Each SAS is able to serve multiple private enterprise networks that include a large number of CBSDs such as base stations, eNodeBs, microcells, picocells, and the like.

The tiered access architecture provides priority access to incumbents, which include Grandfathered Wireless Broadband Licensees that are authorized to operate on a primary basis on frequencies designated in 47 CFR § 96.11. When an incumbent is present in a particular geographical area, the incumbent is granted exclusive access to a portion of the CBRS spectrum. For example, if a Navy ship enters a port, communication systems on the ship are granted exclusive access to a 20-40 MHz band within the 3550-3700 MHz band. Operators that have received a PAL and GAA operators are required to vacate the band allocated to the ship. A PAL license grants exclusive access to a portion of the 3550-3700 MHz band within a predetermined geographical area as long as no incumbents have been allocated an overlapping portion of the 3550-3700 MHz band within the predetermined geographical area. The GAA operators are given access to a portion of the 3550-3700 MHz band within a geographic area as long as no incumbents or PAL licensees have been allocated an overlapping portion in the same geographic area during a concurrent time interval. The GAA operators are also required to share the allocated portion of the 3550-3700 MHz band if other GAA operators are allocated the same portion.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
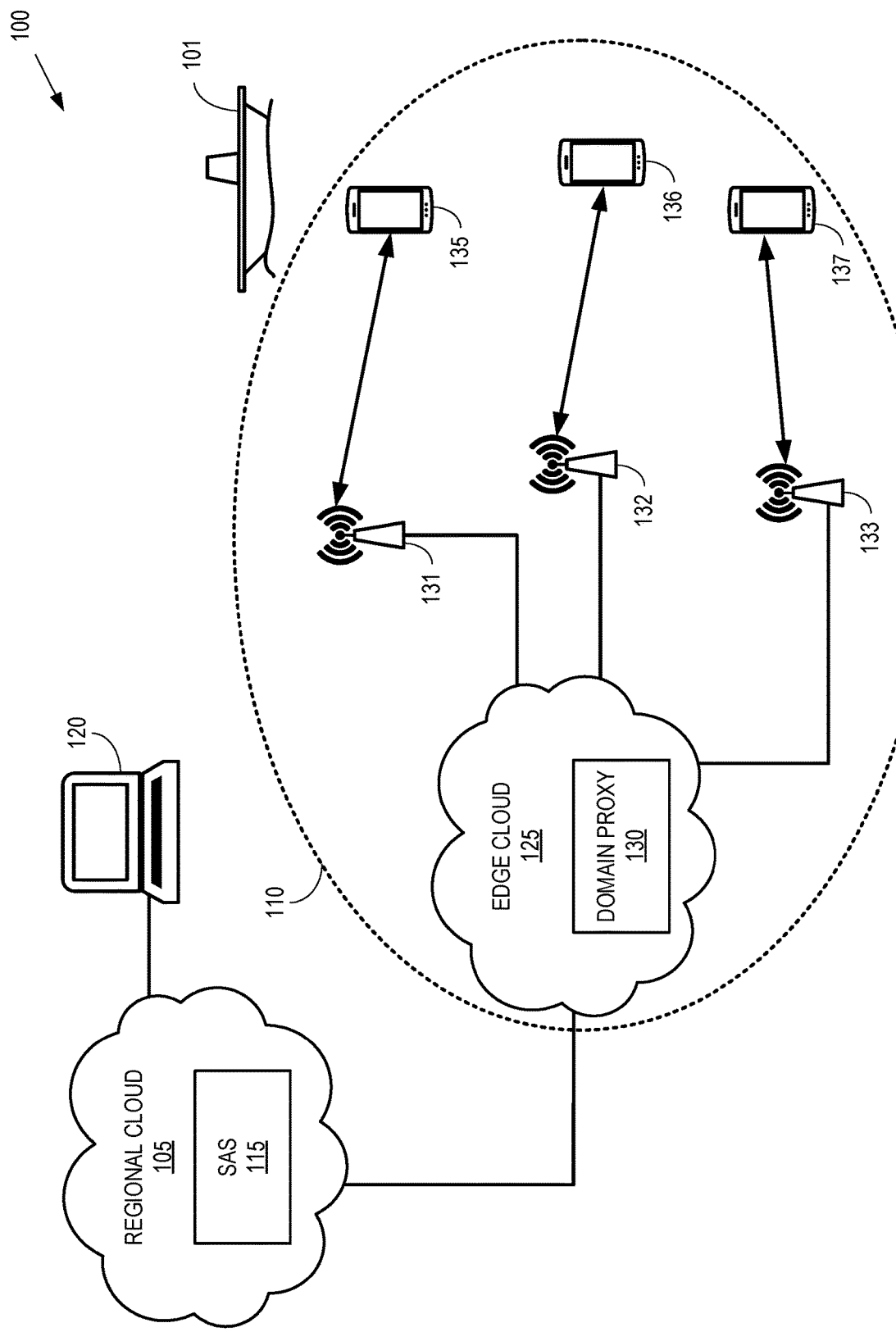
FIG. 1 is a block diagram of a communication system according to some embodiments.

The SAS is responsible for managing or controlling different types of CBSDs in the CBRS frequency bands. In current deployments, the CBSD are categorized as:

Category A—CBSDs designed for indoor deployments with a maximum transmission power limit of 30 dBm, Category B—CBSDs designed for outdoor deployments with a maximum transmission power limit of 47 dBm.

CPE—CBSDs designed for use as customer premises equipment.

Current implementations of the SAS and CBSDs do not support flexible charging architectures that accurately reflect the number of CBSDs being actively served by the SAS at any particular time. The pricing model that is currently under discussion in the industry offers monthly SAS service charge pricing for each type of CBSD even if the CBSD was under the SAS control for a small time interval of few hours in that month. For example, a provider that uses a CBSD would still pay the full monthly service charge even if the CBSD was only under SAS control during an installation period in which a certified technician connected the CBSD to the SAS to validate that the CBSD is operating correctly after installation and the certified technician subsequently place the CBSD in an offline mode until commercial launch of the CBSD with other deployed CBSDs. Furthermore, a monthly charging scheme does not account for CBSD downtime (e.g., CBSDs that are powered down to conserve power) in low traffic area or at times of day such as after closing time within a mall, outside of working hours in an office building, and the like. Thus, SAS or CBSD providers are not able to provide the variety of pricing options desired by different enterprises that are implementing private enterprise networks.

FIGS. 1-10 disclose embodiments of a spectrum access system (SAS) that implements a flexible charging mechanism that determines a time duration that one or more Citizens Band Service Devices (CBSDs) are registered with, and therefore under the control of, the SAS for providing wireless connectivity within a shared spectrum such as one or more channels of the 3550-3700 MHz Citizens Broadband Radio Service (CBRS) spectrum. This solution offers a flexible charging scheme that determines the amount of time each CBSD is under SAS control and allows a charging policy with different levels of granularity (e.g., per minute, per hour, per day, or per month) for each CBSD type (category A, Category B, or CPE) according to the service level agreements with the customer may mandate. The CBSDs are referred to herein as base stations. The SAS then determines a cost based on the time durations that the base stations were registered with the SAS. The base stations are required to register with the SAS before providing service and the SAS begins counting service minutes (or other time interval) in response to a base station successfully registering with the SAS. Once registered, and in response to receiving a channel grant from the SAS for operation in the CBRS band, the base station and the SAS exchange heartbeat messages at predetermined intervals, e.g., at 20 second intervals, 30 second intervals, 60 second intervals, and the like. A service minute (or other service time interval) is added to the total service minutes for a base station in response to at least one heartbeat message being successfully received by the SAS from the base station during the service minute. As per the CBRS operating rules, a base station that loses its connectivity with the SAS in response to no heartbeat messages being successfully received during a timeout interval (such as 240 seconds, 300 seconds, and the like) must cease its operation in the CBRS band and must turn off its transmission on the previously allocated channel to protect the tier 1 incumbents of the CBRS band. The SAS stops accumulating service minutes for the base station when the base station is no longer exchanging heartbeats for operation in the CBRS band with the SAS for any reason.

Some embodiments of the flexible pricing model disclosed herein prevent customers from being charged for base stations that are powered down to conserve energy or base stations that are selectively turned on only for limited time intervals, e.g., during installation, or the case where the SAS itself is unable to serve the base station due to any reason including natural disaster that may impact the SAS operation in a given regional data center. In some embodiments, the SAS implements a tiered pricing system in which the cost of a service minute depends on a category of the base station. For example, the SAS can charge a first cost per service minute for Category A base stations, a second cost per service minute for Category B base stations, and a third cost per service minute for base stations that operate as customer premises equipment (CPE). Some embodiments of the flexible pricing model provide the flexibility to offer discounted rates for service minute based on the volume of each type of CBSD deployed in the network. The discounted rates are an incentive for large customers that may have tens of thousands of CBSDs in their CBRS network as opposed to a small private enterprise network deployment that may contain just a few CBSDs. For example, in unit volume of 10,000 units of each type of CBSD (e.g., Category A, category B, or CPE), the SAS administrator may offer an additional percentage discount to the SAS service minute charge to the customer. This price discount may take into consideration a cumulative volume unit in steps of e.g. 10,000 (of all types of CBSDs) or for each category of CBSD giving maximum flexibility to fulfil the required SLA with all type of large, and small customers.

FIG. 1 is a block diagram of a communication system 100 according to some embodiments. The communication system 100 operates in accordance with the FCC rules set forth in 47 Code of Federal Regulations (CFR) Part 96, which allows sharing of the 3550-3700 MHz Citizens Broadband Radio Service (CBRS) between incumbents and other operators. However, some embodiments of the communication system 100 operate in accordance with other rules, standards, or protocols that support sharing of a frequency band between incumbents and other devices such that the frequency band is available for exclusive allocation to an incumbent device if the incumbent device is present in a geographic area. In that case, the other devices are required to vacate any portion of the frequency band that overlaps with another portion of the frequency band that is allocated to the incumbent device. For example, if the communication system 100 is deployed (at least in part) proximate a port and a Navy ship such as an aircraft carrier 101 arrives in the port, devices in a geographic area proximate the port that are providing wireless connectivity in a portion of the frequency band allocated to the aircraft carrier 101 are required to vacate the portion of the frequency band to provide the aircraft carrier 101 with exclusive access to the frequency band within the geographic area.

The communication system 100 includes a regional cloud 105 that provides cloud-based support for a private enterprise network 110. Some embodiments of the regional cloud 105 include one or more servers that are configured to provide operations and maintenance (O&M) management, a customer portal, network analytics, software management, and central security for the private enterprise network 110.

The regional cloud 105 also includes an SAS 115 to allocate frequency bands to operators, e.g., to the private enterprise network 110 for CBRS within the 3550-3700 MHz band. Operation of the SAS 115 is disclosed in more detail below. A single SAS 115 is shown in FIG. 1 in the interest of clarity. If multiple SAS are present in the communication system 100, the SAS are able to communicate with each other over corresponding SAS-SAS interfaces. The SAS 115 is able to serve multiple private enterprise networks, although a single private enterprise network 110 is shown in FIG. 1 in the interest of clarity.

The regional cloud 105 is configured via user interface portals to one or more external computers 120, only one shown in FIG. 1 in the interest of clarity. For example, the external computer 120 can provide a customer user interface portal for service management, a digital automation cloud management user interface portal, and an SAS user interface portal that is used to configure the SAS 115.

The private enterprise network 110 includes an edge cloud 125 that communicates with the regional cloud 105 to support a plug-and-play deployment of the private enterprise network 110. Some embodiments of the edge cloud 125 support auto configuration and self-service, industrial protocols, local connectivity with low latency, LTE-based communication and local security, high availability, and other optional applications for the private enterprise network 110. In the illustrated embodiment, the edge cloud 125 implements a domain proxy 130 that provides managed access and policy control to a set of CBSDs 131, 132, 133 that are implemented using base stations, base station routers, mini-macrocells, microcells, indoor/outdoor picocells, femtocells, and the like. As used herein, the term "base station" refers to any device that provides wireless connectivity and operates as a CBSD in the private enterprise network 110 as either category A CBSD (Indoor), Category B CBSD (outdoor), or customer premises equipment (CPE). The CBSDs 131, 132, 133 are therefore referred to herein as the base stations 131, 132, 133 and collectively as "the base stations 131-133." Some embodiments of the domain proxy 130 are implemented in the regional cloud 105.

The domain proxy 130 mediates between the SAS 115 and the base stations 131-133. In order to utilize the shared spectrum, the base stations 131-133 transmit requests towards the SAS 115 to request allocation of a portion of a frequency band. The requests include information identifying the portion of the frequency band such as one or more channels, a geographic area corresponding to a coverage area of the requesting base station, and, in some cases, a time interval that indicates when the requested portion of the frequency band is to be used for communication. In the illustrated embodiment, the coverage area of the base stations 131-133 corresponds to the area encompassed by the private enterprise network 110. Some embodiments of the domain proxy 130 reduce the signal load between the domain proxy 130 and the SAS 115 by aggregating requests from multiple base stations 131-133 into a smaller number of messages that are transmitted from the domain proxy 130 to the SAS 115. The base stations 131-133 provide wireless connectivity to corresponding user equipment 135, 136, 137 (collectively referred to herein as "the user equipment 135-137") in response to the SAS 115 allocating portions of the frequency band to the base stations 131-133.

The requests transmitted by the base stations 131-133 do not necessarily include the same information. Some embodiments of the requests from the base stations 131-133 include information indicating different portions of the frequency band, different geographic areas, or different time intervals. For example, the base stations 131-133 request portions of the frequency band for use in different time intervals if the private enterprise network 110 is deployed in a mall or shopping center and the base stations 131-133 are used to provide wireless connectivity within different stores that have different operating hours. The domain proxy 130 therefore manages the base stations 131-133 using separate (and potentially different) policies on a per-CBSD basis. In some embodiments, the domain proxy 130 accesses the policies for the base stations 131-133 in response to receiving a request from the corresponding base station 131-133. The domain proxy 130 determines whether the base station 131-133 is permitted to access the SAS 115 based on the policy, e.g., by comparing information in the policy to information in one or more mandatory fields of the request. The domain proxy 130 selectively provides the requests to the SAS 115 depending on whether the base station 131-133 is permitted to access the SAS 115. If so, the request is transmitted to the SAS 115 or aggregated with other requests for transmission to the SAS 115. Otherwise, the request is rejected.

Figure 2:
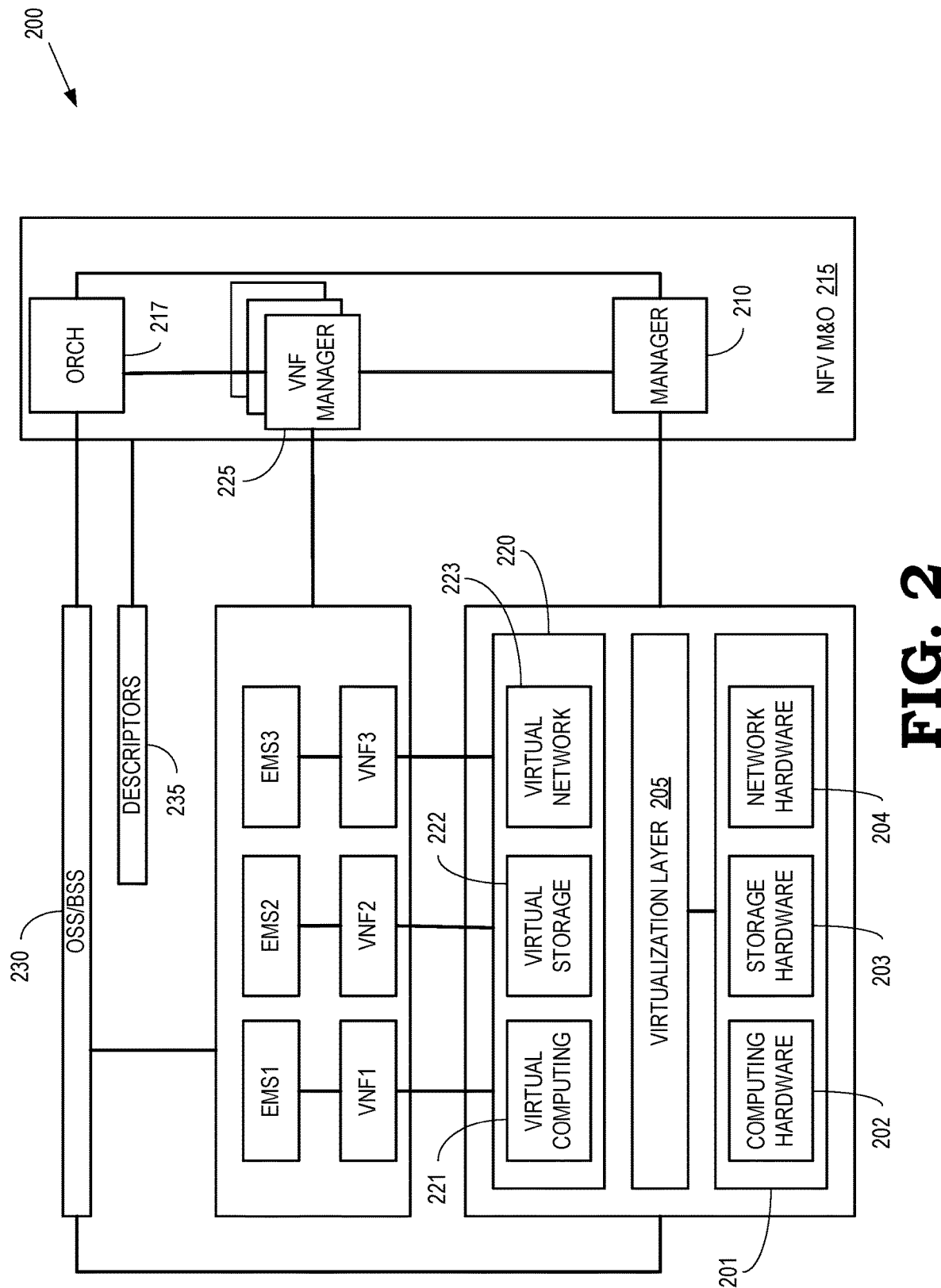
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. For example, the descriptors 235 can be used to store descriptions of a virtual network function implementation of the agent 175 shown in FIG. 1. Information in the descriptors 235 may be updated or modified by the NFV M&O 215.

The NFV architecture 200 can be used to implement network slices that provide user plane or control plane functions. A network slice is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
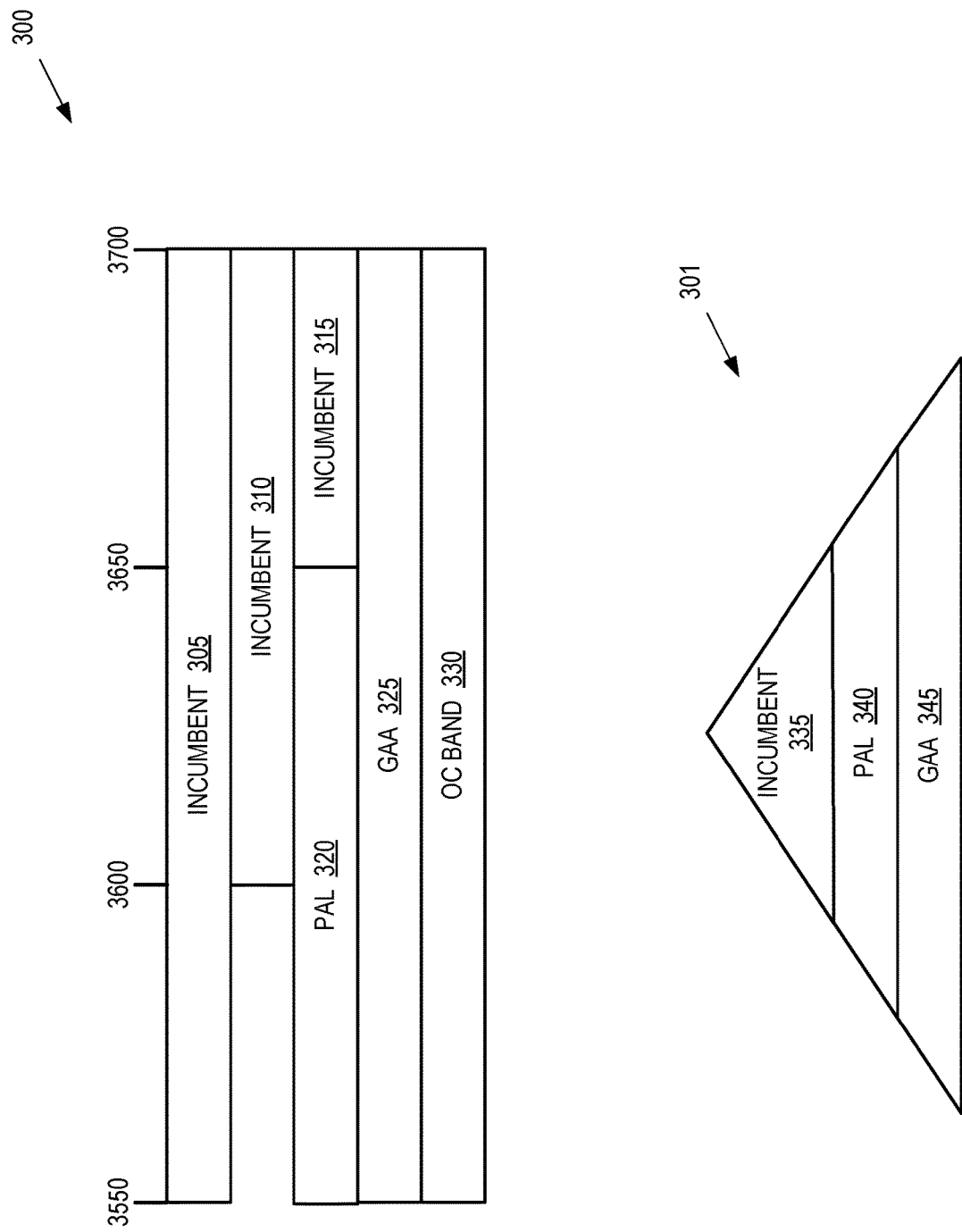
FIG. 3 is a block diagram illustrating an allocation of frequency bands and an access priority for incumbents, licensed users, and general access users according to some embodiments.

FIG. 3 is a block diagram illustrating an allocation 300 of frequency bands and an access priority 301 for incumbents, licensed users, and general access users according to some embodiments. The allocation 300 and the access priorities 301 are used to determine whether CBSDs such as the base stations 131-133 shown in FIG. 1 are given permission to establish a wireless communication links in portions of the frequency band. The frequency band extends from 3550 MHz to 3700 MHz and therefore corresponds to the spectrum allocated for CBRS. An SAS such as the SAS 115 shown in FIG. 1 allocates portions of the frequency band to devices for providing wireless connectivity within a geographic area. For example, the SAS can allocate 20-40 MHz portions of the frequency band to different devices for use as communication channels.

Portions of the frequency band are allocated to incumbent federal radio location devices, such as Navy ships, from the block 305, which corresponds to all of the frequencies in the available frequency band. Portions of the frequency band are allocated to incumbent FSS receive-only earth stations from the block 310. Portions of the frequency band are allocated to grandfathered incumbent wireless broadband services from the block 315. As discussed herein, the portions of the frequency band are allocated from the blocks 305, 310, 315 for exclusive use by the incumbent.

Operators that have received a priority access license (PAL) consistent with 47 CFR § 96.23, et seq. are able to request allocation of portions of the frequency band in the block 320. The portion of the frequency band that is allocated to an operator holding a PAL is available for exclusive use by the operator in the absence of any incumbents in an overlapping frequency band and geographic area. For example, the SAS can allocate a PAL channel in any portion of the entire 150 MHz of CBRS band as long as it is not pre-empted by the presence of an incumbent. Portions of the frequency band within the block 325 are available for allocation to general authorized access (GAA) operators that are authorized to implement one or more CBSDs consistent with 47 CFR § 96.33, et seq. The GAA operators provide wireless connectivity in the allocated portion in the absence of any incumbents or PAL licensees on an overlapping frequency band and geographic area. The GAA operators are also required to share the allocated portion with other GAA operators, if present. Portions of the frequency band within the block 330 are available to other users according to protocols defined by the Third Generation Partnership Project (3GPP).

The access priority 301 indicates that incumbents have the highest priority level 335. Incumbents are therefore always granted exclusive access to a request to portion of the frequency band within a corresponding geographic area. Lower priority operators are required to vacate the portion of the frequency band allocated to the incumbents within the geographic area. The access priority 301 indicates that PAL licensees have the next highest priority level 340, which indicates that PAL licensees receive exclusive access to an allocated portion of the frequency band in the absence of any incumbents. The PAL licensees are also entitled to protection from other PAL licensees within defined temporal, geographic, and frequency limits of their PAL. The GAA operators (and, in some cases, operators using other 3GPP protocols) received the lowest priority level 345. The GAA operators are therefore required to vacate portions of the frequency band that overlap with portions of the frequency band allocated to either incumbents or PAL licensees within an overlapping geographic area.

Figure 4:
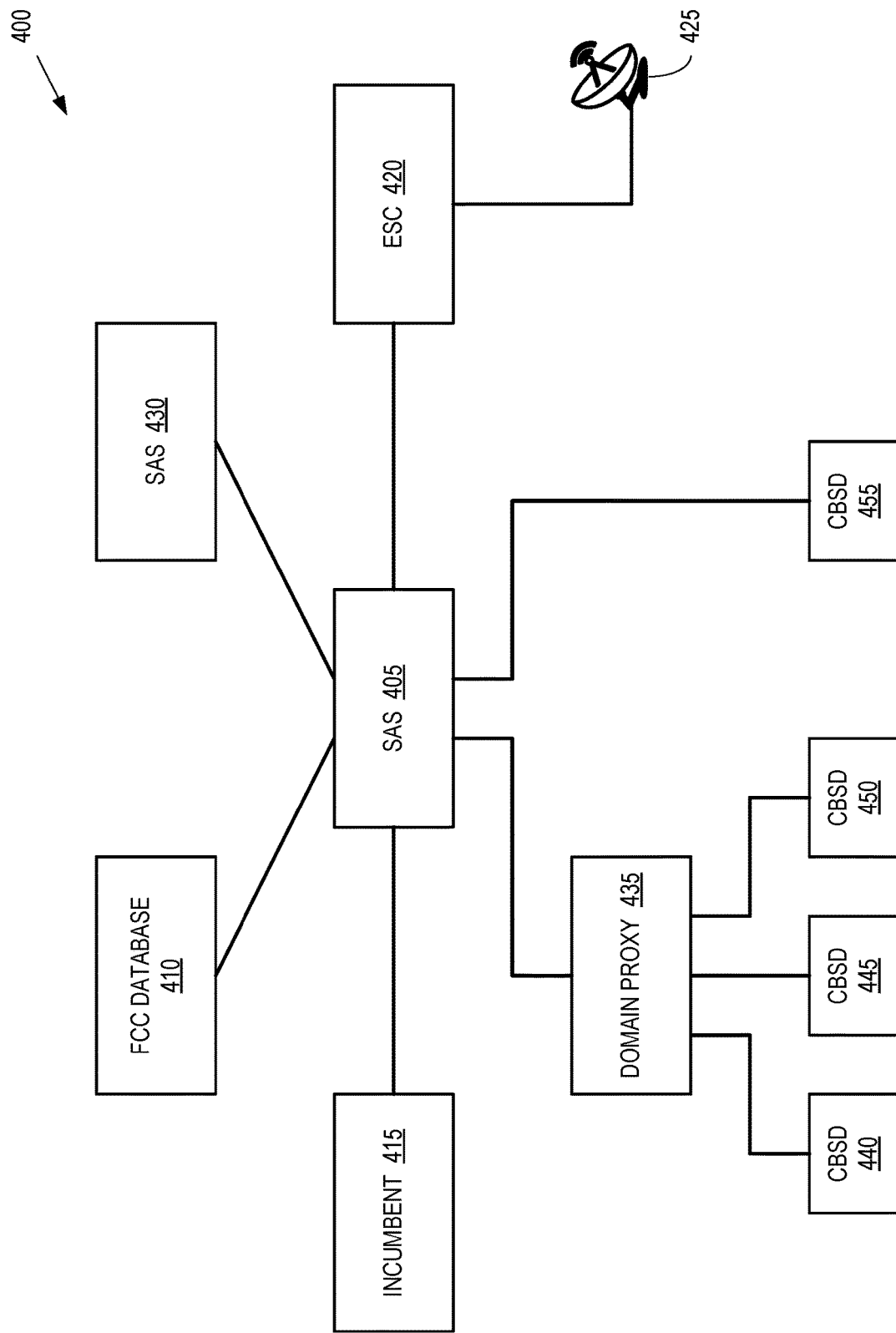
FIG. 4 is a block diagram of a communication system that implements tiered spectrum access according to some embodiments.

FIG. 4 is a block diagram of a communication system 400 that implements tiered spectrum access according to some embodiments. In the illustrated embodiment, the communication system 400 implements tiered spectrum access in the 3550-3700 CBRS band via a WInnForum architecture. The communication system 400 includes an SAS 405 that performs operations including incumbent interference determination and channel assignment, e.g., for CBRS channels shown in FIG. 3. An FCC database 410 stores a table of frequency allocations that indicate frequencies allocated to incumbent users and PAL licensees. An informing incumbent 415 provides information indicating the presence of the incumbent (e.g., a coverage area associated with the incumbent, and allocated frequency range, a time interval, and the like) to the SAS 405. The SAS 405 allocates other portions of the frequency range to provide exclusive access to the informing incumbent 415 within the coverage area. An environmental sensing capability (ESC) 420 performs incumbent detection to identify incumbents using a portion of a frequency range within the geographic area, e.g., using a radar sensing apparatus 425. Some embodiments of the SAS 405 are connected to other SAS 430 via corresponding interfaces so that the SAS 405, 430 are able to coordinate allocation of portions of the frequency range in geographic areas or time intervals.

A domain proxy 435 mediates communication between the SAS 405 and one or more CBSD 440, 445, 450 via corresponding interfaces. The domain proxy 435 receives channel access requests from the CBSDs 440, 445, 450 and verifies that the CBSDs 440, 445, 450 are permitted to request channel allocations from the SAS 405. The domain proxy 435 forwards requests from the permitted CBSDs 440, 445, 450 to the SAS 405. In some embodiments, the domain proxy 435 aggregates the requests from the permitted CBSDs 440, 445, 450 before providing the aggregated request to the SAS 405. The domain proxy 435 aggregates requests based on an aggregation function that is a combination of two parameters: (1) a maximum number of requests that can be aggregated into a single message and (2) a maximum wait duration for arrival of requests that are to be aggregated into a single message. For example, if the wait duration is set to 300 ms and the maximum number of requests is 500, the domain proxy accumulates receive requests until the wait duration reaches 300 ms or the number of accumulated requests which is 500, whichever comes first. If only a single request arrives within the 300 ms wait duration, the "aggregated" message includes a single request.

Thus, from the perspective of the SAS 405, the domain proxy 435 operates as a single entity that hides or abstracts presence of the multiple CBSDs 440, 445, 450 and conveys communications between the SAS 405 and the CBSDs 440, 445, 450. One or more CBSD 455 (only one shown in the interest of clarity) are connected directly to the SAS 405 and can therefore transmit channel access requests directly to the SAS 405. Additional discussion of this architecture is provided in Appendix B, from the Wireless Innovation Forum, entitled "Requirements for Commercial Operation in the U.S. 3550-3700 MHz Citizens Broadband Radio Service Band", Working Document WINNF-TS-0112, Version V1.4.130, Jan. 16, 2018, which is incorporated by reference herein in its entirety.

Figure 5:
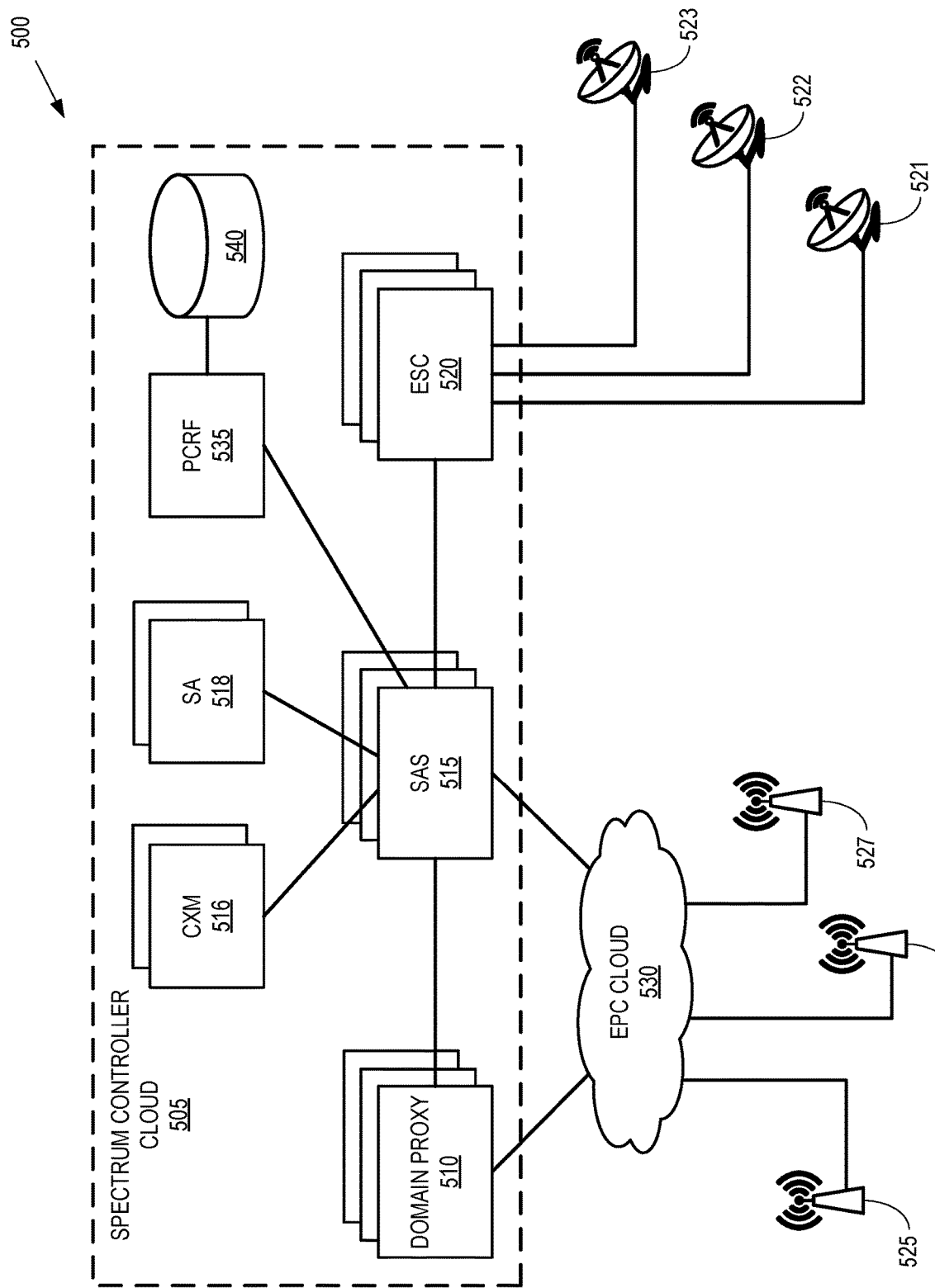
FIG. 5 is a block diagram of a communication system that implements a spectrum controller cloud to support deployment of private enterprise networks in a shared spectrum according to some embodiments.

FIG. 5 is a block diagram of a communication system 500 that implements a spectrum controller cloud 505 to support deployment of private enterprise networks in a shared spectrum according to some embodiments. The spectrum controller cloud 505 instantiates multiple instances of domain proxies 510 that support one or more private enterprise networks. The spectrum controller cloud 505 also instantiates multiple SAS instances 515 that support one or more private enterprise networks. Although not shown in FIG. 5, the SAS instances 515 can be connected to other SAS instances, e.g., in other clouds, via corresponding interfaces. Coexistence management (CXM) functions 516 and spectrum analytics (SA) functions 518 are also instantiated in the spectrum controller cloud 505.

One or more ESC instances 520 are instantiated and used to detect the presence of incumbents. In the illustrated embodiment, standalone ESC sensors 521, 522, 523 (collectively referred to herein as "the sensors 521-523") are used to monitor a frequency band to detect the presence of an incumbent such as a Navy ship. The ESC instances 520 notify the corresponding instance of the SAS 515 in response to detecting the presence of an incumbent in a corresponding geographic area. The SAS 515 is then able to instruct non-incumbent devices that serve the geographic area to vacate portions of the spectrum overlapping with the spectrum allocated to the incumbent, e.g., by defining a DPA.

One or more base stations 525, 526, 527 (collectively referred to herein as "the base stations 525-527") in a private enterprise network communicate with one or more of the domain proxies 510 and the SAS instances 515 via an evolved packet core (EPC) cloud 530. The base stations 525-527 have different operating characteristics. For example, the base station 525 operates according to a PAL in the 3.5 GHz frequency band, the base station 526 operates according to GAA in the 3.5 GHz frequency band, and the base station 525 operates according to a PAL and GAA in the 3.5 GHz frequency band. The base stations 525-527 are configured as Category A (indoor operation with a maximum power of 30 dBm), Category B (outdoor operation with a maximum power of 47 dBm), or CPE. However, in other embodiments, one or more of the base stations 525-527 are configured as either Category A, Category B, or CPE. The EPC cloud 530 provides functionality including LTE EPC operation support system (OSS) functionality, analytics such as traffic analytics used to determine latencies, and the like.

The spectrum controller cloud 505 also includes a policy control and rules function (PCRF) 535 that creates policy rules and makes policy decisions for network subscribers in real-time. The PCRF 535 supports service data flow detection, policy enforcement, and flow-based charging. Policies created or accessed by the PCRF 535 for network subscribers are stored in a corresponding database 540 in records associated with the different subscribers. In some embodiments, the policies created by the PCRF 535 include charging policies that are used to determine a service time interval that indicates a level of granularity that is mandated by a service level agreement. As used herein, the term "service time interval" refers to a smallest unit of time that can be separately billed or charged to a customer that owns or operates base station 525-527 that is registered with an SAS 515 and has been granted access to one or more channels of a shared spectrum to provide wireless connectivity. The granularity of the service time interval can be a minute, an hour, a day, a month, or any other larger or smaller interval of time. As discussed herein, the SAS 515 increments a usage of a connection between the base station 525-527 and the SAS 515 in response to the SAS receiving information (such as a heartbeat message) indicating that the base station 525-527 has an active connection with the SAS 515 during the service time interval. The SAS 515 does not increment the usage if the base station 525-527 does not have an active connection with the SAS 515 during the service time interval. The SAS 515 charges a customer associated with the base station 525-527 a cost based on the usage determined by the SAS 515.

Figure 6:
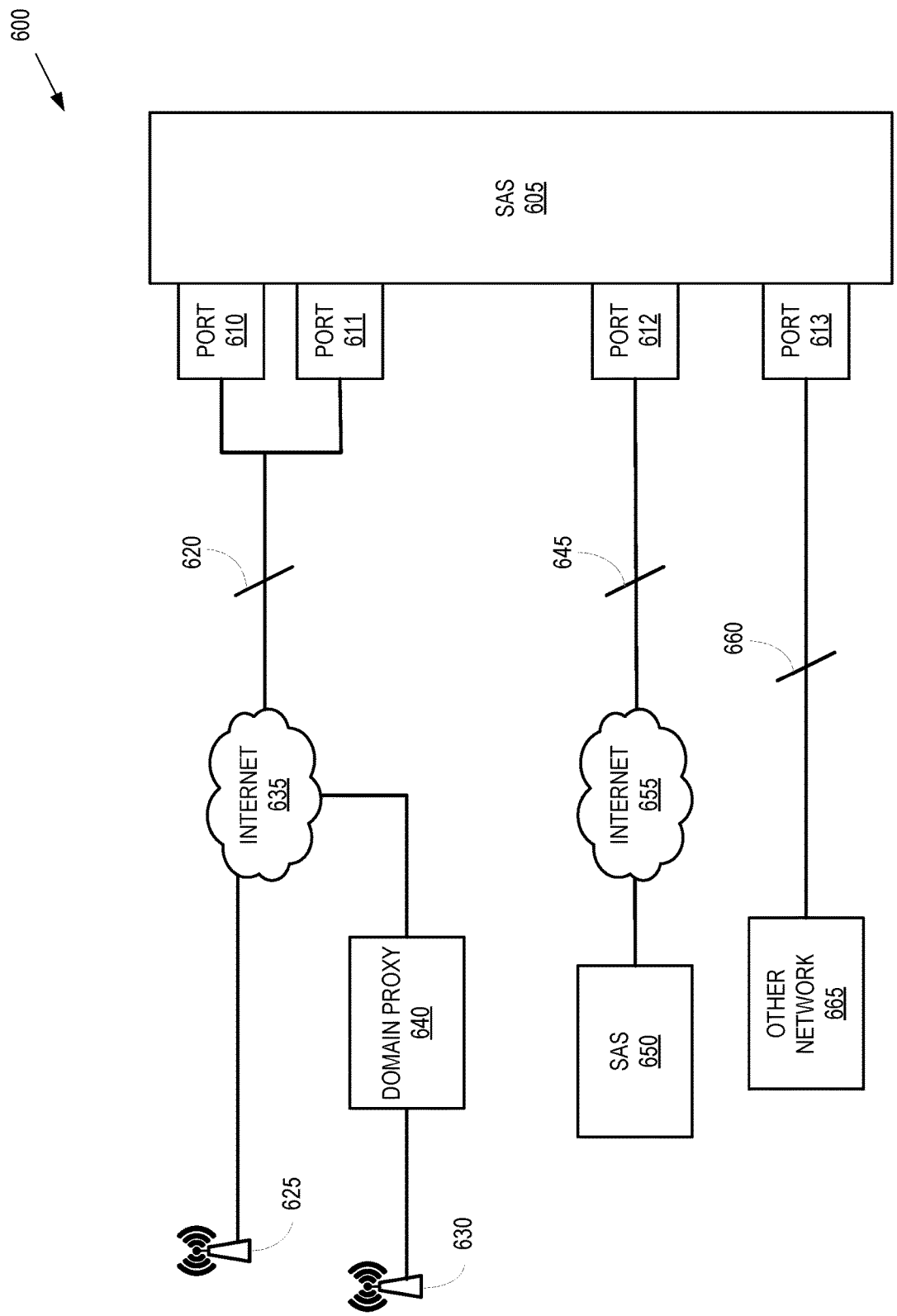
FIG. 6 is a block diagram of communication system including interfaces between CBSDs and an SAS according to some embodiments.

FIG. 6 is a block diagram of communication system 600 including interfaces between CBSDs and an SAS 605 according to some embodiments. The SAS 605 is used to implement some embodiments of the SAS 115 shown in FIG. 1, the SAS 405, 430 shown in FIG. 4, and the instances of the SAS 515 shown in FIG. 5. The SAS 605 includes ports 610, 611, 612, 613 (collectively referred to herein as "the ports 610-613") that provide access to the SAS 605.

An interface 620 supports communication between the SAS 605 and CBSDs 625, 630 via a network such as the Internet 635 and the ports 610, 611. The CBSD 625 is connected directly to the SAS 605 via the interface 620. The CBSD 630 is connected to the SAS 605 via a domain proxy 640 that is connected to the SAS 605 by the interface 620. The domain proxy 640 corresponds to some embodiments of the domain proxy 130 shown in FIG. 1, the domain proxy 435 shown in FIG. 4, and the instances of the domain proxy 510 shown in FIG. 5. An interface 645 supports communication between the SAS 605 and one or more other SAS 650 (only one shown in FIG. 6 in the interest of clarity) via a network such as the Internet 655 and the port 612. The SAS 650 can be owned and operated by other providers. An interface 660 supports communication between the SAS 605 and one or more other networks 665 (only one shown in FIG. 6 in the interest of clarity) via the port 613.

Figure 7:
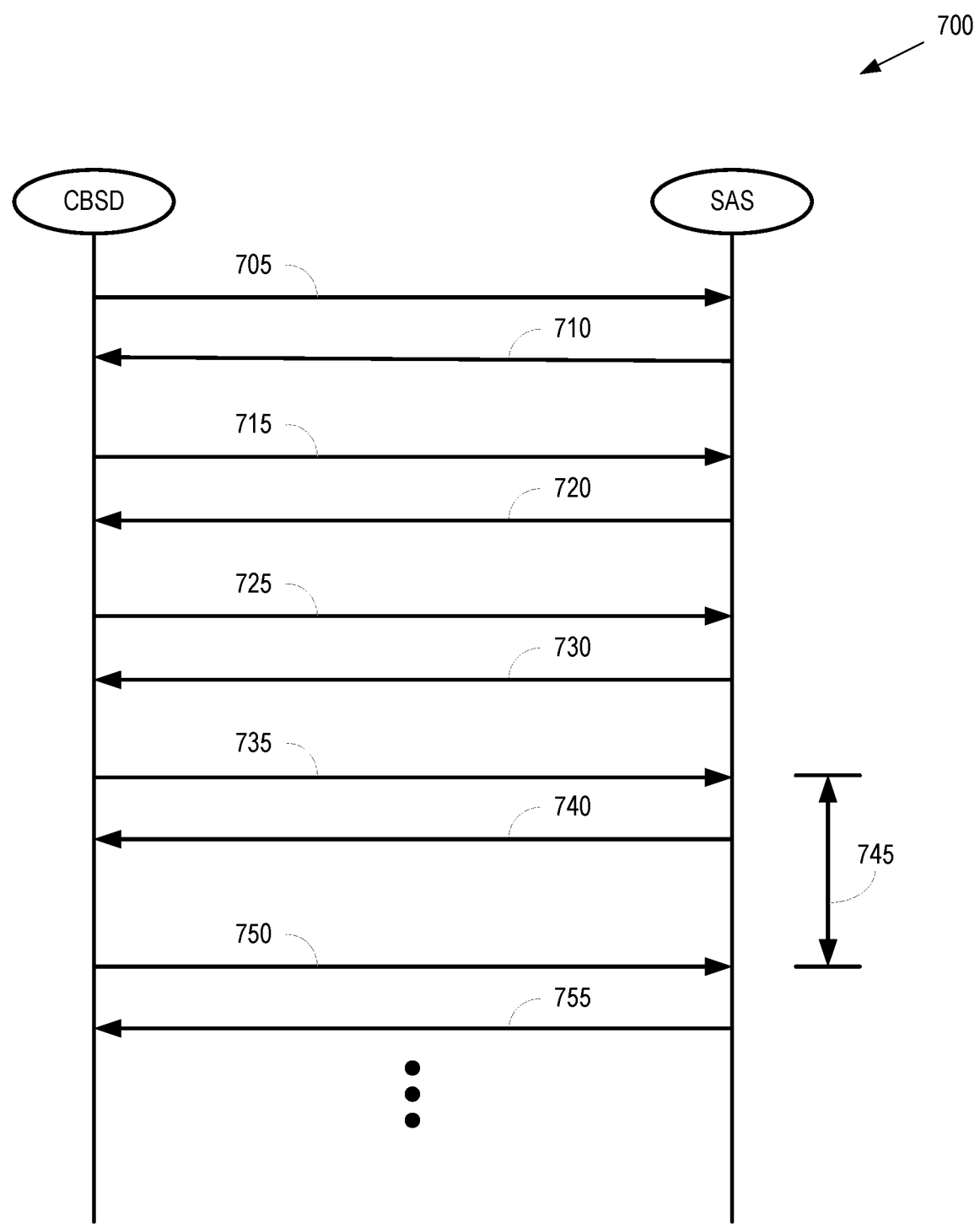
FIG. 7 is a message flow that illustrates messages exchanged between a CBSD and an SAS according to some embodiments.

FIG. 7 is a message flow 700 that illustrates messages exchanged between a CBSD and an SAS according to some embodiments. The message flow 700 is implemented in some embodiments of the communication system 100 shown in FIG. 1, the communication system 400 shown in FIG. 4, the communication system 500 shown in FIG. 5, and the communication system 600 shown in FIG. 6.

The CBSD initiates a registration procedure to register the CBSD for SAS services by transmitting a registration request 705 to the SAS. The registration request 705 includes information indicating a type of the CBSD such as Category A, Category B, or CPE. The type of the CBSD is used to determine pricing information for the CBSD. For example, an outdoor CBSD typically has a larger coverage area and is therefore charged at a higher charging rate relative to an indoor CBSD or a CPE. The SAS administer uses the volume and the SAS service time intervals for fine-grained service charge determination based on the type of the CBSD and the customer associated with the registered CBSD. The SAS responds to the registration request 705 by transmitting a registration response 710 that indicates whether the SAS accepts or rejects the request.

Some embodiments of the CBSD transmit a spectrum inquiry 715 to the SAS. The spectrum inquiry 715 is sent by the CBSD to the SAS to discover what channels may be available for operation in the CBRS band to provide wireless connectivity. Based on the list of available channels provided by the SAS, the CBSD can determine the one or more channels suitable for its operation based on various measurements such as signal strength measurements on pilot signals, signal-to-noise ratios, received signal strength indicators, and the like. The SAS responds to the spectrum inquiry 715 with a spectrum inquiry response 720 that indicates one or more available channels in the shared spectrum. The available channels can include some or all of the requested channels or other channels that the SAS determines are available for providing wireless connectivity.

The CBSD transmits a grant request 725 to the SAS. Some embodiments of the grant request 725 include information identifying one of the channels indicated in the spectrum inquiry response 720. The SAS responds by transmitting a grant response 730, which indicates whether the SAS granted or denied the request. If the grant response 730 indicates that the request is granted, the grant response 730 also includes information defining a frequency of heartbeat messages that are to be transmitted between the CBSD and the SAS to indicate an active connection. The frequency of the heartbeat messages can be indicated by a time interval between successive heartbeat messages such as 20 seconds, 30 seconds, 60 seconds, and the like.

The CBSD transmits a first heartbeat message 735 to the SAS, which responds with a second heartbeat response message 740. The CBSD waits for a predetermined time interval 745 after transmitting the first heartbeat message 735 to transmit a third heartbeat message 750. The SAS responds with a fourth heartbeat response message 755. The CBSD and the SAS continue to exchange heartbeat messages at the heartbeat frequency indicated in the grant response 730. The SAS increments usage of the connection between the CBSD and the SAS for each service time interval that includes at least one successful transmission and reception of a heartbeat message. If the SAS and CBSD do not successfully exchange a heartbeat message during a service time interval, the SAS does not increment the usage so that the customer that owns or operates the CBSD is not charged for that service time interval. As discussed herein, if there is no heartbeat exchange between the CBSD and the SAS for more than a timeout interval (such as 240 seconds or 300 seconds), the rules set forth in 47 CFR Part 96 require that the CBSD must cease its operation in the CBRS band. Setting the heartbeat frequency at a relatively high frequency, and relatively low time interval between successive transmissions such as 20 seconds, provides an opportunity to each CBSD to exchange multiple heartbeat messages per minute.

Figure 8:
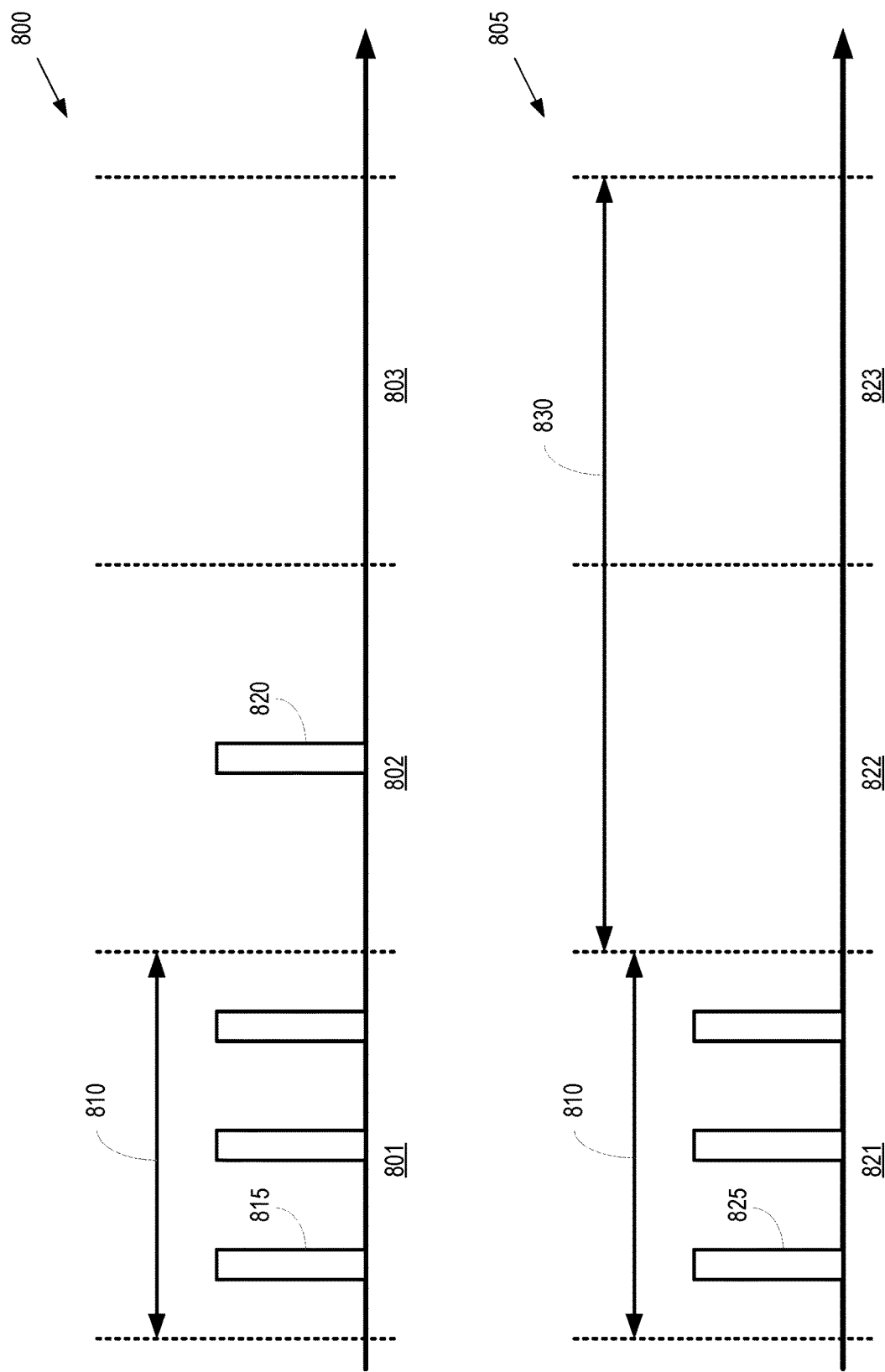
FIG. 8 is a block diagram of two sequences of heartbeat message exchanges between a CBSD and an SAS according to some embodiments.

FIG. 8 is a block diagram of two sequences 800, 805 of heartbeat message exchanges between a CBSD and an SAS according to some embodiments. Time increases from left to right in FIG. 8. The sequences 800, 805 are exchanged in some embodiments of the communication system 100 shown in FIG. 1, the communication system 400 shown in FIG. 4, the communication system 500 shown in FIG. 5, and the communication system 600 shown in FIG. 6.

The sequence 800 includes three service time intervals 801, 802, 803 that have a duration 810, which is established according to policies or rules indicated in a service level agreement for a customer that owns or operates the CBSD. Three heartbeat messages 815 (only one indicated by a reference numeral in the interest of clarity) are successfully exchanged during the service time interval 801. The SAS therefore increments usage for the CBSD by an amount that corresponds to one service time interval. A single heartbeat message 820 is successfully exchanged during the service time interval 802. Although this may imply that two other heartbeat messages were not successfully exchanged during the service time interval 802, the SAS determines that the CBSD and the SAS maintained a successful connection for at least a portion of the service time interval 802. The SAS therefore increments the usage for the CBSD by an amount that corresponds to one service time interval. No heartbeat messages are successfully exchanged during the service time interval 803. For example, the CBSD can be powered down due to policy control to conserve energy during the service time interval 803. The SAS therefore does not increment the usage for the CBSD and the customer that owns or operates the CBSD is not charged for usage during the service time interval 803.

The sequence 805 includes three service time intervals 821, 822, 823 that have the duration 810. Three heartbeat messages 825 (only one indicated by a reference numeral in the interest of clarity) are successfully exchanged during the service time interval 821. The SAS therefore increments usage for the CBSD by an amount that corresponds to one service time interval. No heartbeat messages are successfully exchanged during the service time intervals 822, 823. The SAS therefore does not increment the usage for the CBSD during the service time intervals 822, 823. A timeout interval 830 is also established for the CBSD and the SAS. In the illustrated embodiment, the CBSD and the SAS do not successfully exchange heartbeat messages for a period of time that is equal to or greater than the timeout interval 830. According to FCC rules, the CBSD must cease its operation in the CBRS band and must turn off its transmission on the previously allocated channel to protect the tier 1 incumbents of the CBRS band.

Figure 9:
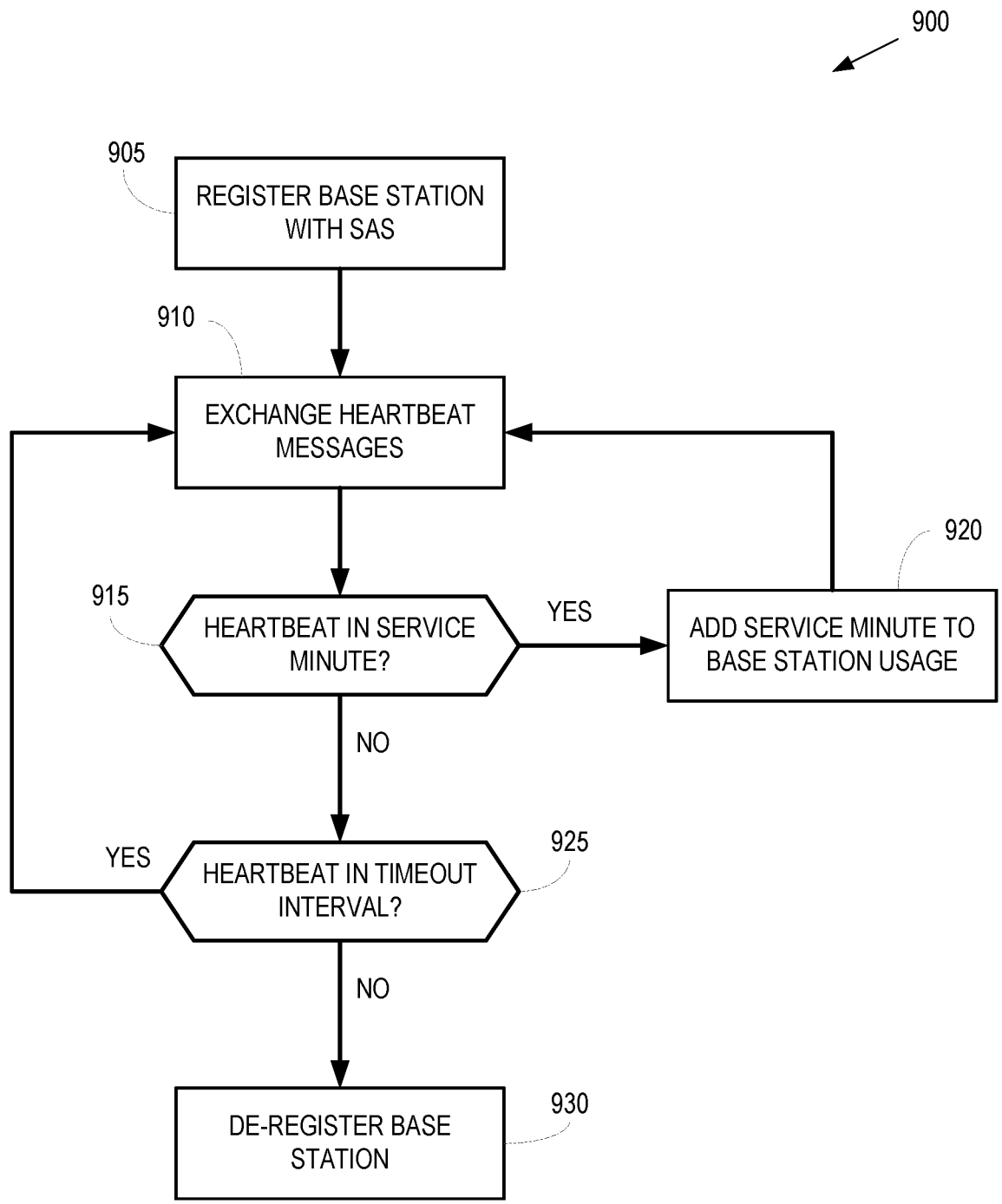
FIG. 9 is a flow diagram of a method of determining usage of an SAS service by a CBSD according to some embodiments.

FIG. 9 is a flow diagram of a method 900 of determining usage of an SAS service by a CBSD according to some embodiments. The method 900 is implemented in some embodiments of the communication system 100 shown in FIG. 1, the communication system 400 shown in FIG. 4, the communication system 500 shown in FIG. 5, and the communication system 600 shown in FIG. 6. In the illustrated embodiment, a service time interval for a connection between the CBSD and an SAS is set equal to one minute and the service time interval is referred to as a service minute. However, finer or coarser levels of granularity are used for the service time intervals in other embodiments.

At block 905, a base station is registered with an SAS. As discussed herein, registration of the base station with the SAS includes the base station transmitting a registration request to the SAS and receiving a grant response from the SAS indicating that the base station has been allocated one or more channels in a shared spectrum for providing wireless connectivity. The registration request message includes information identifying the type of the base station such as Category A, Category B, or CPE. The SAS records the device type in a database associated with a PCRF, such as the database 540 associated with the PCRF 535 shown in FIG. 5.

At block 910, the base station and the SAS exchange heartbeat messages at a frequency that is determined during registration of the base station. The frequency is indicated by a time interval between successive heartbeat messages such as 20 seconds, 30 seconds, 60 seconds, and the like.

At decision block 915, the SAS determines whether at least one heartbeat message has been received in the current service minute. If so, the method 900 flows to block 920. If no heartbeat messages were received during the current service minute, the method 900 flows to decision block 925.

At block 920, the SAS increments usage associated with the base station by adding information corresponding to a service minute to the accumulated base station usage. The method 900 then flows to block 910 and the base station and the SAS continue to exchange heartbeat messages in subsequent service minutes.

At decision block 925, the SAS determines whether any heartbeat messages have been received within a timeout interval. If so, the message flows to block 910 and the base station and the SAS continue to exchange heartbeat messages. If not, the method 900 flows to block 930 and the base station is de-registered or marked as in "inactive" state from the SAS service.

Figure 10:
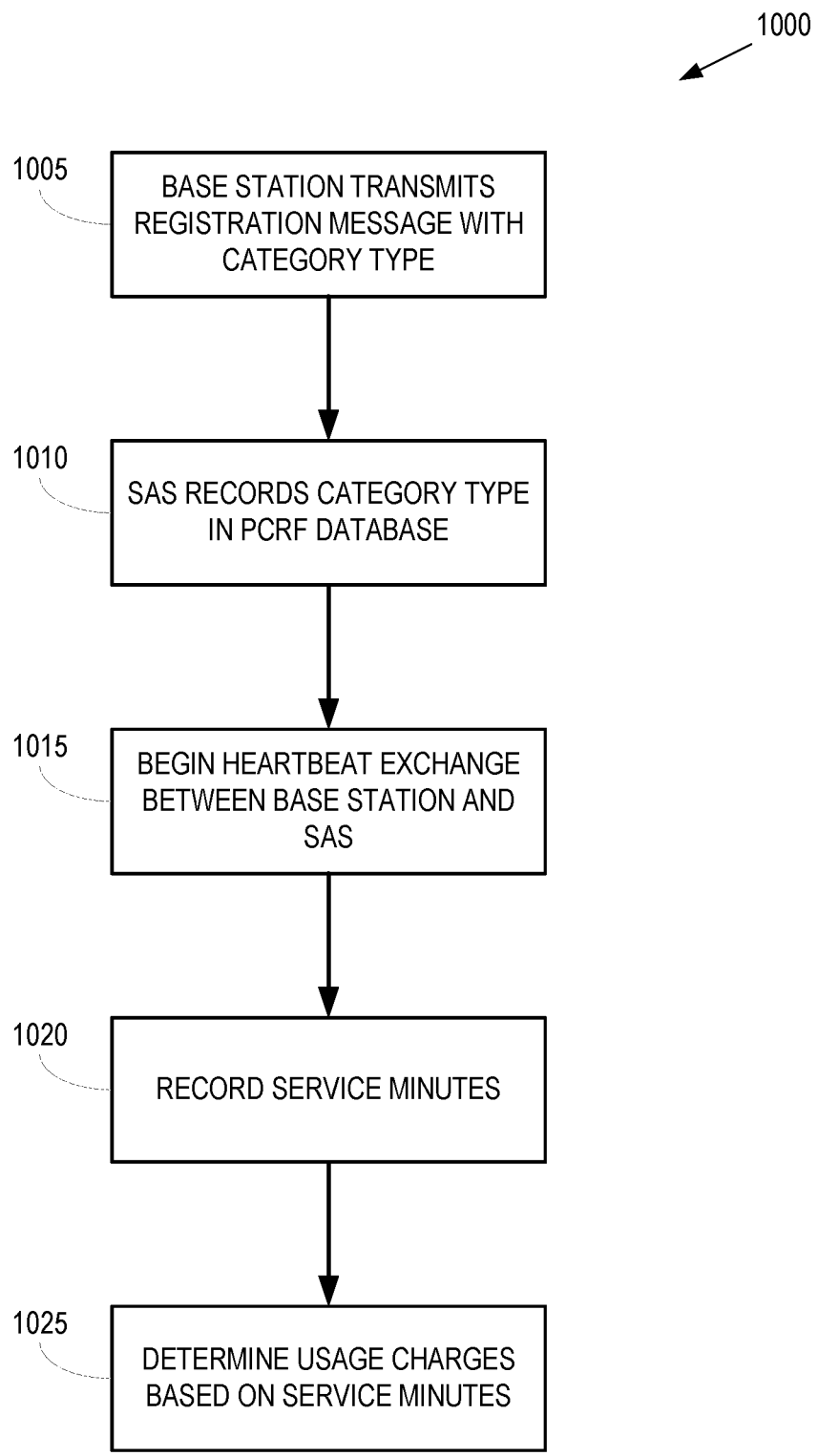
FIG. 10 is a flow diagram of a method for charging a customer that owns or operates a CBSD and an SAS system according to some embodiments.

FIG. 10 is a flow diagram of a method 1000 for charging a customer that owns or operates a CBSD and an SAS system according to some embodiments. The method 1000 is implemented in some embodiments of the communication system 100 shown in FIG. 1, the communication system 400 shown in FIG. 4, the communication system 500 shown in FIG. 5, and the communication system 600 shown in FIG. 6.

At block 1005, a base station transmits a registration message to register with an SAS. The registration message includes information indicating a category type of the base station such as Category A, Category B, or CPE.

At block 1010, the SAS records information indicating the category type in a PCRF database, such as the database 540 associated with the PCRF 535 shown in FIG. 5.

At block 1015, the base station and the SAS begin exchanging heartbeat messages at a frequency or time interval indicated by a grant message transmitted from the SAS to the base station in response to receiving the registration message.

At block 1020, the SAS records information indicating the service minutes (or other service time intervals) in which at least one heartbeat message was successfully exchanged between the base station and the SAS. For example, the SAS increments the usage for the base station for each service minute that includes at least one successful heartbeat message. The SAS does not increment the usage for the base station during a service minute that does not include a successful heartbeat message.

At block 1025, the SAS determines usage charges for the customer that owns or operates the base station. In some embodiments, the SAS determines the usage charges based on the accumulated or total usage for the base station and a charging rate per service minute (or other service time interval). In some embodiments, different charging rates are applied for different types of base stations. In some embodiments, the SAS discounts the cost that is charged to the customer based on a number of base stations associated with the customer. For example, an SAS administrator can offer a percentage discount to customers that deploy more than a threshold number of base stations, such as 10,000 base stations.

Some embodiments of the flexible charging architecture disclosed herein allows an SAS administrator to compute SAS service charge for each CBSD with a granularity of minutes, although finer or coarser granularities can also be used. For larger customers that may deploy tens of thousands of CBSDs, the SAS administrator may provide a tiered pricing model in units of 10,000. The tiered pricing model may either be for total number of CBSDs of all types or for each category of CBSDs (outdoor, indoor, or CPE). Some embodiments of the flexible charging architecture apply different pricing rate for each CBSD category type. Rather than charging a flat SAS service charge/fee per CBSD per month, this mechanism provides a more granular and accurate mechanism for charging the SAS service fee when the CBSDs are operational in the CBRS band under SAS control. The customer is not charged when the CBSDs are not operational. For example, if a CBSD is powered down due to a policy control mechanism (e.g. all CBSDs in the various stores/locations within a mall are powered down to conserve energy during mall non-operational hours), the customer is only billed SAS service charges for the time (in granularity of minutes) each of their CBSDs has an active connection with the SAS and is under the SAS control, e.g., as indicated by successful heartbeat message exchanges. In some embodiments, CBRS radio access networks that include a very large number of CBSD can count total SAS service minutes by counting aggregate across all CBSDs in the network. Thus, the flexible charging architecture disclosed herein enables a SAS operator to create fine grained, tiered spectrum access models.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:

hardware-only circuit implementations (such as implementations and only analog and/or digital circuitry) and combinations of hardware circuits and software, such as (as applicable):

a combination of analog and/or digital hardware circuit(s) with software/firmware and any portions of a hardware processor(s) with software (including digital signal processor(s), software, and memory(ies) that work together to cause an apparatus, such as a mobile phone or server, to perform various functions) and hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   granting, at a spectrum access system (SAS), at least one channel of a shared spectrum to a base station;
   incrementing a usage of a connection between the base station and the SAS in response to the SAS receiving information indicating that the base station has an active connection with the SAS during a service time interval, wherein the SAS does not increment the usage if the base station does not have an active connection with the SAS during the service time interval; and
   charging a customer associated with the base station a cost based on the usage determined by the SAS.

2. The method of claim 1, wherein granting the at least one channel of the shared spectrum comprises granting the at least one channel of the shared spectrum in response to receiving a request from the base station to provide connectivity using the shared spectrum.

3. The method of claim 1, wherein granting the at least one channel of the shared spectrum comprises providing, from the SAS, information indicating a frequency of heartbeat messages exchanged by the base station and the SAS.

4. The method of claim 1, wherein the service time interval is determined based on a charging policy that indicates a level of granularity that is mandated by a service level agreement.

5. The method of claim 1, wherein incrementing the usage of the connection between the base station and the SAS comprises incrementing the usage by an amount corresponding to the service time interval in response to the SAS receiving at least one heartbeat message during the service time interval.

6. The method of claim 5, wherein incrementing the usage of the connection between the base station and the SAS comprises incrementing the usage by the amount corresponding to the service time interval in response to the SAS receiving more than one heartbeat message during the service time interval.

7. The method of claim 1, further comprising:
   interrupting incrementing the usage in response to determining that the base station is no longer exchanging heartbeat messages with the SAS; and
   resuming incrementing the usage in response to determining that the base station has resumed exchanging heartbeat messages with the SAS.

8. The method of claim 1, wherein charging the customer associated with the base station comprises determining the cost based on the usage and a charging rate per service time interval.

9. The method of claim 8, wherein charging the customer associated with the base station comprises discounting the cost based on a number of base stations associated with the customer.

10. An apparatus comprising:
    a transmitter configured to transmit a message granting at least one channel of a shared spectrum to a base station;
    a receiver configured to receive heartbeat messages from the base station; and
    a processor configured to increment a usage of a connection between the base station and the apparatus in response to the receiver receiving information indicating that the base station has an active connection with the apparatus during a service time interval, wherein the processor does not increment the usage if the base station does not have an active connection with the apparatus during the service time interval, and wherein the processor is configured to charge a customer associated with the base station a cost based on the usage.

11. The apparatus of claim 10, wherein the transmitter is configured to transmit a message granting the at least one channel of the shared spectrum in response to receiving a request from the base station to provide connectivity using the shared spectrum.

12. The apparatus of claim 10, wherein the transmitter is configured to transmit a message including information indicating a frequency of heartbeat messages exchanged by the base station and the apparatus.

13. The apparatus of claim 10, wherein the service time interval is determined based on a charging policy that indicates a level of granularity that is mandated by a service level agreement.

14. The apparatus of claim 10, wherein the processor is configured to increment the usage by an amount corresponding to the service time interval in response to the receiver receiving at least one heartbeat message during the service time interval.

15. The apparatus of claim 14, wherein the processor is configured to increment the usage by the amount corresponding to the service time interval in response to the receiver receiving more than one heartbeat message during the service time interval.

16. The apparatus of claim 10, wherein the processor is configured to:
   interrupt incrementing the usage in response to determining that the base station is no longer exchanging heartbeat messages with the apparatus; and
   resume incrementing the usage in response to determining that the base station has resumed exchanging heartbeat messages with the apparatus.

17. The apparatus of claim 10, wherein the processor is configured to determine the cost based on the usage and a charging rate per service time interval.

18. The apparatus of claim 17, wherein the processor is configured to discount the cost based on a number of base stations associated with the customer.

19. An apparatus comprising:
   at least one processor; and
   at least one memory including computer program code;
   the at least one memory and the computer program code configured to, with the at least one processor, cause the apparatus at least to perform:
      granting at least one channel of a shared spectrum to a base station;
      incrementing a usage of a connection between the base station and the apparatus in response to the apparatus receiving information indicating that the base station has an active connection with the apparatus during a service time interval, wherein the processor does not increment the usage if the base station does not have an active connection with the apparatus during the service time interval; and
      charging a customer associated with the base station a cost based on the usage determined by the apparatus.

20. The apparatus of claim 19, wherein the at least one memory and the computer program code are configured to, with the at least one processor, cause the apparatus at least to perform:
   interrupting incrementing the usage in response to determining that the base station is no longer exchanging heartbeat messages with the apparatus; and
   resuming incrementing the usage in response to determining that the base station has resumed exchanging heartbeat messages with the apparatus.

* * * * *